April 7, 1953   J. C. BROWN   2,633,994
LID RACK
Filed March 29, 1951   2 SHEETS—SHEET 1
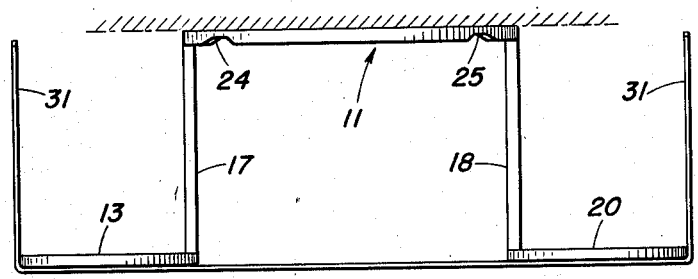
Fig. 2.
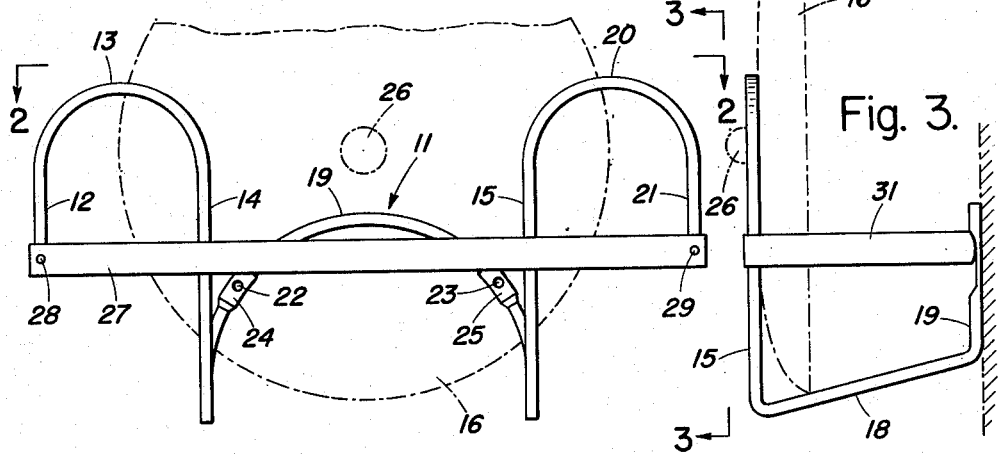
Fig. 3.
Fig. 1.
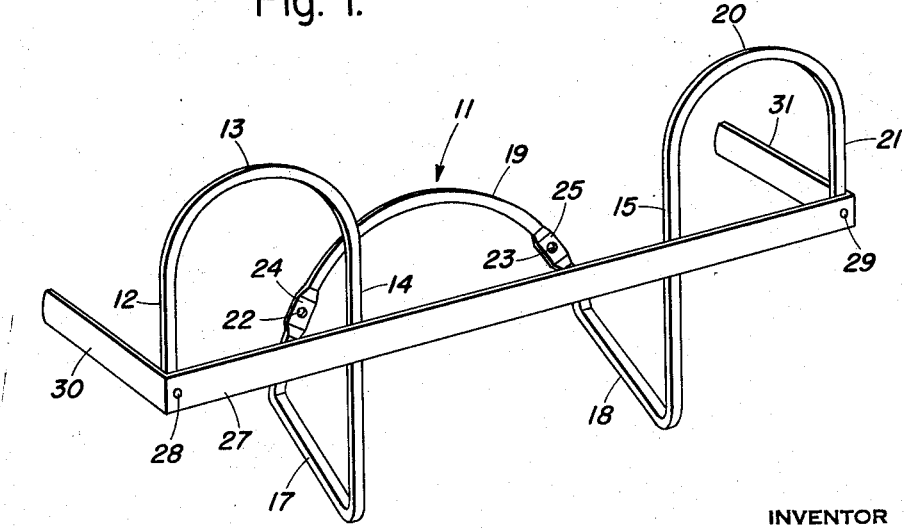
Fig. 4.
INVENTOR
John Clark Brown
BY
Arthur Middleton
ATTORNEY April 7, 1953  J. C. BROWN  2,633,994
LID RACK Filed March 29, 1951  2 SHEETS—SHEET 2

INVENTOR
John Clark Brown
BY
Arthur Middleton
ATTORNEY

Patented Apr. 7, 1953

2,633,994

UNITED STATES PATENT OFFICE 2,633,994

LID RACK

John Clark Brown, Upper Montclair, N. J.

Application March 29, 1951, Serial No. 218,250

3 Claims. (Cl. 211—41)

This invention relates to lid racks for supporting lids used on kitchen pots and skillets and particularly those racks which are formed from wire and intended to be hung on a kitchen wall.

Wall racks must be formed from a minimum of material and with a minimum of operations if they are to be produced at a price which makes the rack a marketable item. In the high labor market existing today, items of the type of this invention must not have a single moment of waste labor involved in their production, or they will be doomed to commercial failure.

It thus becomes an object of this invention to develop a lid rack which will be extremely low in price and which will be capable of high speed production with a minimum of labor. It is a further object to develop a rack which will be adaptable to production by automatic machines, and another object is that the rack be formed from a continuous strip of wire. It is still a further object that this device be of sufficient structural strength that it withstand the normal hard wear it will receive in continued use. These and other objects will be developed as this specification proceeds.

In summary, this invention proposes to attain these objects by providing a one-piece continuous bent wire frame of a tri-arched construction which may be formed by the use of only two high-speed machine operations. This tri-arched construction provides positive support for the pot lids to prevent them from falling forward or backward from the rack, to prevent their lateral motion, and simultaneously to shield the covers from being knocked from the rack by being inadvertently struck.

This construction uses a minimum of wire because each segment of wire is used to the fullest extent and no wastage thereof results.

Reference is now made to the drawings for a specific embodiment of this invention, but it is intended that this be illustrative only and is not to be deemed limiting, as the scope of the invention should be determined by the appended claims and their equivalents.

Figure 1 is a front view of the lid rack showing a pot lid being supported in the rack.

Figure 2 is a top view of the lid rack mounted on a wall or other support.

Figure 3 is a side view of the lid rack with a pot lid in place.

Figure 4 is a perspective view showing the relative position of all the parts of the rack.

Figure 5:
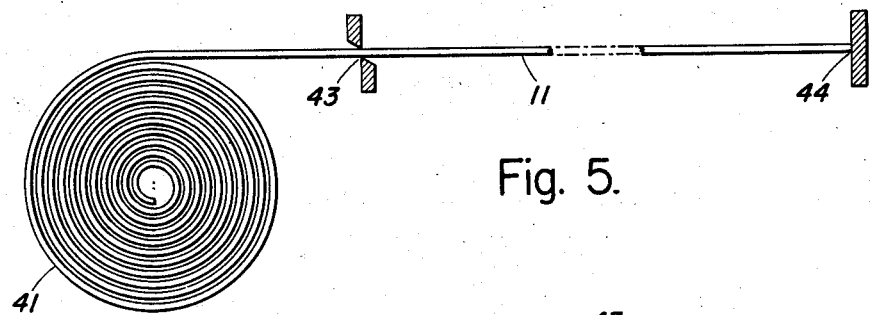
Figure 5 shows a coil of wire with the basic length of wire being cut therefrom.

In the figures, the basic lid rack 11 is formed from a continuous single piece of wire. The wire begins with straight section 12 and is bent into first arch 13. This arch terminates in vertical wire 14, which, with its counterpart vertical wire 15, forms the basic support for the pot lid 16, preventing it from falling from the lid rack 11. Vertical wires 14 and 15 are then connected to extension arms 17 and 18, respectively. These extension arms form the resting supports for the lid cover 16. The length of the extension arms determines the width of the lid rack and automatically determines the capacity of the rack. Extension arms 17 and 18 terminate in mounting arch 19 which forms the principal structural support for holding the lid rack firmly against the wall or other mounting. Downcomer 15 at its upper end connects with arch 20, thus completing the symmetrical arrangement of the three arches. Arch 20 is finally connected to the straight piece 21, completing the entire wire arrangement. In order to mount the lid rack easily, there are provided two screw holes 22 and 23 located in flattened portions 24 and 25, respectively. There is thus provided a minimum of screws for supporting the rack to the wall because by locating the screws midway up the center arch there is a sufficient amount of wire on either side of each screw to form a firm grip on the wall. Thus the forward motion of the pot lids is prevented by vertical wires 14 and 15 and their associated arches; the backward movement is prevented by arch 19 and the wall to which the rack is attached; and the lateral movement by resting arms 17 and 18. With arrangement of arches, the amount of wire required is reduced to a minimum and yet the desired function is attained. The center portion of the rack is left open and unencumbered, leaving room for lid handle 26 or other protuberances on the center portion of the cover being supported in the rack.

Surrounding the basic one piece lid rack structure, there is shown a flat metal facing strip 27. This strip 27 is connected to the lid rack by weld 28 and extends across the rack to its other end, where it is connected by weld 29. This strip serves several functions, including lending structural strength to the basic rack, protecting the sharp edges of the rack, particularly of arms 12 and 21, and further lends a decorative touch to the otherwise functional rack. To complete the encirclement of the rack, there are provided side strips 30 and 31 unitarily connected to facing strip 27. Strips 30 and 31 are about the same length as resting arms 17 and 18, thus extending to, but not contacting, the wall or other support on which the rack is placed.

With strips 27, 30 and 31 in place, there is provided a structure which completely surrounds the lids when they are in place on the rack. If they should be accidentally hit, they will not fall from the rack.

Figure 6:
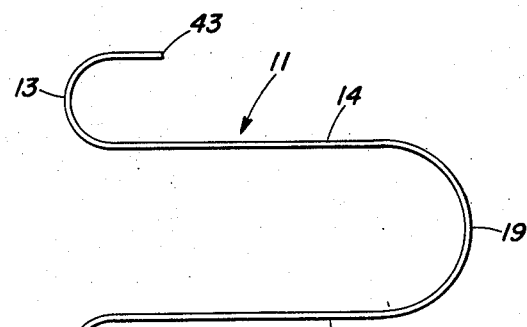
Figure 6 is a view of the wire after having been formed in one plane into the tri-arched shape.
Figure 7:
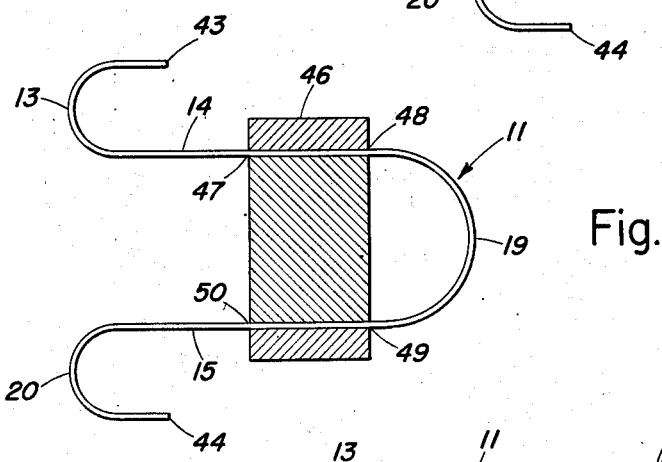
Figure 7 is a view of the preformed shape of Figure 6 preparatory to bending into final form.
Figure 8:
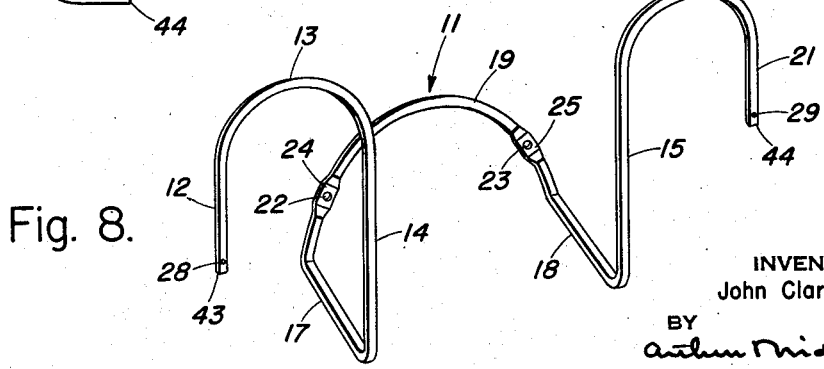
Figure 8 is the lid rack in final form.

The basic rack is formed from one piece of continuous wire in the following manner: the heavy wire frame is first formed by cutting a predetermined length of wire 11 from the coil 41. The length of wire 11 is shown in Figure 5 as the amount between the cut formed at 43 and 44. In the first operation, the three arches are formed in one plane. This is shown in Figure 6 in which the wire 11 is bent into the preliminary shape with arches 13, 19 and 20 in one plane. This may be accomplished in an automatic four slide machine such as that manufactured by the A. H. Nilson Machine Company, Bridgeport, Connecticut. This preformed shape is fed to a press shown in Figure 7 in which there is shown only the lower die 46. The upper die (not shown) strikes the wire 11 lying on the die 46 and bends it angularly at corners 48 and 49 to form the center arch 19. Simultaneously, the opposite edge of the die strikes arm 14 bending it at point 47 and strikes arm 15 bending it at point 50. This completes the formation of the basic rack and results in the shape shown in Figure 8.

This press operation may be carried out in any sort of a standard fast press with the slight modification that it must be adapted to accommodate the rack and perform the double pressing action at the one time. This is permitted by this invention, because by its basic concept, all the arches are pointed in the same direction at the completion of the operation, thus permitting a single stroke to bend them into this one direction.

In two operations, namely, forming and pressing, the wire rack is completed in form. The remaining features are also formed in fast operations because of the simplicity of the structure. The flattening and piercing to provide holes 22 and 23 for screws is done in a two-step die which is also a fast feed machine operation.

The flat facing strip is also capable of fast-forming and shaping, and can be formed completely in one operation on an automatic feed into a four-slide machine. Welding this strip to the frame is done in one operation. This completes the entire structure as shown and the laboring costs in production are only a fraction of those connected with the more complicated apparatus developed earlier.

It is to be understood that although this specification mentions the use of pot lids in this rack, it is also within the concept of this invention to use the rack for holding plates or other household objects of like character.

I claim:

1. A lid rack comprising a single continuous length of wire formed into three arches, the first arch adapted to contact a support and to be hung therefrom, an arch on either side thereof and horizontally spaced therefrom a sufficient distance to accommodate at least one lid therebetween, the latter arches forming the forward wall of the rack preventing the lids from falling forward from the rack and of sufficient width to completely encompass the lid when in place, an extension arm connecting each of the forward arches at its inside bottom end to the first arch at its bottom end on each side to complete a continuous structure, and a facing strip connected to the side arches for reinforcing the structure and holding lids in the rack.

2. A lid rack according to claim 1, wherein the first arch is pierced with a hole on each side midway up the arch adapted to receive supporting screws.

3. A lid rack according to claim 1, wherein the facing strip comprises a front section and two side sections, the front section spanning the forward part of the rack and attached to the outside edge of each of the forward arches, and the side sections extending in a direction parallel to the extension arms and of a length substantially equal thereto.

JOHN CLARK BROWN.

REFERENCES CITED

The following references are of record in the file of this patent:

UNITED STATES PATENTS

| Number | Name | Date |
| --- | --- | --- |
| 869,995 | Timberlake | Nov. 5, 1907 |
| 1,333,469 | Coursen | Mar. 9, 1920 |
| 1,359,125 | Stevens | Nov. 16, 1920 |
| 1,608,497 | Fischer | Nov. 30, 1926 |
| 1,755,654 | Kottke | Apr. 22, 1930 |
| 1,842,118 | Resnik et al. | Jan. 19, 1932 |